(12) United States Patent
Taido et al.

(10) Patent No.: US 8,399,799 B2
(45) Date of Patent: Mar. 19, 2013

(54) METHOD FOR MANUFACTURING SPARK PLUG

(75) Inventors: Akikazu Taido, Nagoya (JP); Tomoaki Kato, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 655 days.

(21) Appl. No.: 12/594,380

(22) PCT Filed: Mar. 31, 2008

(86) PCT No.: PCT/JP2008/056410
§ 371 (c)(1),
(2), (4) Date: Oct. 2, 2009

(87) PCT Pub. No.: WO2008/123511
PCT Pub. Date: Oct. 16, 2008

(65) Prior Publication Data
US 2010/0116794 A1   May 13, 2010

(30) Foreign Application Priority Data

Apr. 3, 2007 (JP) ................. P2007-097526

(51) Int. Cl.
*B23K 26/00* (2006.01)
(52) U.S. Cl. .............. 219/121.64; 219/121.63
(58) Field of Classification Search ............ 219/121.63, 219/121.64
See application file for complete search history.

(56) References Cited

U.S. PATENT DOCUMENTS

| 5,440,198 | A | 8/1995 | Oshima et al. |
| 6,533,628 | B1 | 3/2003 | Matsutani |
| 6,790,113 | B1* | 9/2004 | Fujita ................... 445/7 |
| 6,997,767 | B2 | 2/2006 | Taniguchi et al. |
| 2002/0121849 | A1 | 9/2002 | Kanao et al. |
| 2003/0038577 | A1* | 2/2003 | Hori et al. ........... 313/141 |

(Continued)

FOREIGN PATENT DOCUMENTS

| JP | A-06-036856 | 2/1994 |
| JP | 2001-135456 | 5/2001 |

(Continued)

OTHER PUBLICATIONS

Japanese Patent Office, Office Action for related Japanese Application No. 2008-072691, issued Sep. 28, 2010.

(Continued)

*Primary Examiner* — Benjamin Sandvik
(74) *Attorney, Agent, or Firm* — Stites & Harbison, PLLC; Jeffrey A. Haeberlin; Nicolo Davidson

(57) ABSTRACT

A method for manufacturing a spark plug is a method for manufacturing the spark plug having an electrode base member and a noble metal tip welded thereto by means of a laser or an electrode base member, a tip base member joined thereto, and a noble metal tip welded to the tip bases material by means of a laser, and the method includes a laser welding process of welding the electrode base member or the tip base member to the noble metal tip by means of a laser and through use of a laser beam whose BBP value assumes 25 mm·mrad (a radius·a half angle) or less at a time point when a laser beam enters a transfer optical system for guiding the laser beam to areas to be welded where laser welding is to be performed.

8 Claims, 14 Drawing Sheets

U.S. PATENT DOCUMENTS

| | | |
|---|---|---|
| 2004/0173588 A1 | 9/2004 | Benz et al. |
| 2006/0280217 A1 | 12/2006 | Zervas et al. |

FOREIGN PATENT DOCUMENTS

| | | |
|---|---|---|
| JP | 2002-170648 | 6/2002 |
| JP | 2002-237370 A | 8/2002 |
| JP | 2002-313524 A | 10/2002 |
| JP | 2003-59618 | 2/2003 |
| JP | 2003-59620 A | 2/2003 |
| JP | 2005-95929 A | 4/2005 |
| JP | 2005-346928 | 12/2005 |
| JP | 2006-185784 A | 7/2006 |
| JP | A-2006-527494 | 11/2006 |
| WO | 2004112207 A1 | 12/2004 |

OTHER PUBLICATIONS

International Preliminary Report on Patentability and Written Opinion of the International Searching Authority, issued Oct. 13, 2009, for International Application No. PCT/JP2008/056410.

The State Intellectual Property Office of P.R. China, Office Action for related Chinese Application No. 200880011528.1.5, issued Jul. 4, 2011.

EPO, Supplementary European Search Report in corresponding European application No. EP 08 73 9523, completed Dec. 13, 2012.

* cited by examiner (a)

(b)

(a)

(b)

(a)

(b)

METHOD FOR MANUFACTURING SPARK PLUG

TECHNICAL FIELD

The present invention relates to a method for manufacturing a spark plug.

BACKGROUND ART

In some spark plugs, noble metal tips made of noble metal and having superior wearing resistance are provided at a center electrode and an outer electrode opposing each other so as to enhance ignitability and durability.

The use of laser welding to join a noble metal tip to a center electrode or an outer electrode is proposed (see, for example, Patent Document 1).

Patent Document 1: JP-A-6-36856

In a spark plug described in Patent Document 1, an entire circumference of a boundary between a noble metal tip and a center electrode is welded by a laser, and the noble metal tip is joined to the center electrode by way of a wedged, fused, solidified metal alloy. Laser welding is described as making it possible to weld a noble metal tip to a leading-end face of a center electrode without deforming the noble metal tip, so that there can be provided a spark plug that prevents removal of a noble metal tip caused by repeated exertion of heat stress.

DISCLOSURE OF THE INVENTION

Problem to be Solved by the Invention

However, Patent Document 1 provides no mention of quality of a laser beam used for laser welding, for example, a divergence angle of the laser beam. Meanwhile, it has also been found that, in a spark plug whose noble metal tip is welded by a laser, variations arise in exfoliation resistance of a noble metal tip according to the nature of a laser irradiation unit used.

Accordingly, a repeated study of a relationship between the quality of a laser beam and the exfoliation resistance conducted by the present inventors show a presence of a relationship between the divergence angle of the laser beam and the exfoliation resistance.

The present invention has been conceived in light of the above-described circumstance, and an object thereof is to provide a method for manufacturing a spark plug capable of enhancing an exfoliation resistance of a noble metal tip from an electrode base member or a tip base member or enhancing an exfoliation resistance of a metal shell from an outer electrode.

Means for Solving the Problem

Means for solution is A method for manufacturing a spark plug, the spark plug comprising: an electrode base member and a noble metal tip laser-welded thereto, or an electrode base member, a tip base member joined thereto, and a noble metal tip laser-welded to the tip base member, said method comprising: a laser welding process for subjecting the electrode base member and the noble metal tip to laser welding or for subjecting the tip base member and the noble metal tip to laser welding, by use of a laser beam whose BPP value is 25 mm·mrad (a radius·a half angle) or less at a time point when the laser beam enters a transfer optical system for guiding laser beam to an area to be welded where the laser welding is to be performed.

According the manufacturing method of the present invention, a laser beam whose BPP value is 25 mm·mrad (a radius·a half angle) or less at a time point when the laser beam enters a transfer optical system is used in the laser welding process as a laser beam to be used for laser welding. The spark plug manufactured through the laser welding process can be enhanced in terms of exfoliation resistance of a noble metal tip when compared with a spark plug manufactured by use of a laser beam having a larger BPP value. Specifically, a spark plug enhanced in terms of exfoliation resistance of a noble metal tip can be manufactured.

A BPP value (beam parameter product) is one parameter representing the quality of a laser beam and expressed by the product of a radius $\omega$ (mm) of a laser beam and a half angle $\theta$ (mrad) of a spread of the laser beam that are achieved at a focal point.

$$BPP = \omega \cdot \theta \; (\text{mm·mrad}) \tag{1}$$

The following are presumed as reasons for occurrence of a difference as mentioned previously.

For example, a case where there is used a laser beam "a" having a small BPP value (BPPa) is compared with a case where there is used a laser beam "b" having a large BPP value (BPPb) (BPPa<BPPb). Provided that aberration, or the like, of an optical system is ignored, that the diameter of a spot acquired at a focal point is taken as "d", that a focal length of the optical system is taken as "f", and that the diameter of an incident beam is taken as "D", a relationship of d=(4f/D)× BPP is known to stand. Therefore, on the assumption that the laser beam "a" and the laser beam "b" have the same spot diameter "d" and the same incident beam diameter D at a focal point, it is turned out that the focal length "f" (fa and fb) of the optical system can be set to fa>fb. Namely, it is understood that the diameter of the laser beam "a" can be made smaller than the diameter of the laser beam "b" in front of and behind the focal point. Therefore, an area can be fused up to a deep, narrow point, so long as laser welding is performed by use of a laser beam whose BPP value is small. For this reason, a difference between a point close to a surface and a deep point, both of which belong to an area where the noble metal tip and the electrode base member (or the tip base member) are fused together, in terms of a fused portion (i.e., a width achieved in a cross section) becomes smaller. This phenomenon is considered to contribute to exfoliation resistance of the noble metal tip.

In particular, on the occasion when a noble metal tip is joined to a Ni alloy, or the like, that have different coefficients of thermal expansion, adoption of such configuration is considered to be preferable.

In addition, at the time of laser welding, a laser beam output position of an optical system, or the like, can be separated from a workpiece (a noble metal tip, or the like) by an amount corresponding to an increase in focal length "f." Hence, it is easy to prevent adhesion of sputtered substances, which would arise during laser welding, to a lens or another member of an optical system or occurrence of an interference among a workpiece, a member for holding the workpiece, and an optical system.

A BPP value achieved at a time point when a laser beam enters a transfer optical system refers to a BPP value of a laser beam achieved at an entrance of the transfer optical system, such as a mirror and a lens, for guiding a laser beam originated from a laser light source to an area to be welded, such as a noble metal tip. Therefore, for example, when a mirror is interposed between a laser light source and an area to be welded, the BPP value refers to a BPP value of a laser beam achieved at an entrance of the mirror. Further, when an optical fiber is interposed, the BPP value refers to a BPP value of a laser beam achieved at an entrance of the optical fiber. Moreover, when a laser beam is emitted from the laser light source directly to an area to be welded without involvement of optical equipment, such as a mirror (a laser beam emitted from the laser light source arrives at an area to be welded by way of only a space), the BPP value refers to a BPP value of the laser beam emitted from the laser light source.

For example, a tip made of noble metal that is less consumed when used is mentioned as the noble metal tip. More specifically, a tip made of Pt, Ir, or Ir doped with a rare earth oxide, a Pt—Ir alloy material, an Ir—Rh alloy material, and the like, can be mentioned.

An alloy exhibiting superior heat resistance is sufficient for the electrode base member. For example, a material made of Cr or a Ni alloy including Fe, for example, INCONEL 600 (trade name), can be mentioned as the electrode base member.

For example, a material made of Cr or a Ni alloy including Fe, for example, INCONEL 600 (trade name), can be mentioned as the tip base member. It is better to join the tip base member to the electrode base member after the noble metal tip has been welded by means of a laser.

Moreover, in the above-described method for manufacturing a spark plug, the laser welding process may be an entire circumference laser welding process for welding an entire circumference of the noble metal tip by means of a laser while the noble metal tip and the electrode base member or the noble metal tip and the tip base member rotate relatively to the laser beam around an axial line of the noble metal tip.

The laser welding process of the present invention includes an entire circumference laser welding process for radiating a laser beam having a small BPP value as described above to an entire circumference. Therefore, a spark plug including a noble metal tip that is enhanced in terms of exfoliation resistance along its entire circumference can be manufactured.

In order to radiate a laser beam to the entire circumference of a noble metal tip such that the noble metal tip is relatively rotated around its axial line, there is mentioned a case where the noble metal tip and the electrode base member or the noble metal tip and the tip base member are rotated around the axial line of the noble metal tip and exposed to the laser beam while a laser beam irradiation unit is fixed. Conversely, a laser beam can also be emitted by moving the laser beam irradiation unit around the axial line of the noble metal tip while positions of the noble metal tip and the electrode base member or positions of the noble metal tip and the tip base member are fixed.

The laser beam employed in the present invention can also be a pulse laser beam or a CW laser beam.

Moreover, in the above-described method for manufacturing a spark plug, the laser welding may be performed in the laser welding process such that a fused portion where the electrode base member and the noble metal tip are fused together or a fused portion where the tip base member and the noble metal tip are fused together is connected at a center of the noble metal tip in a radial direction thereof.

In order to enhance exfoliation resistance of the noble metal tip, it is desirable to perform laser welding in such a way that a fused portion where the noble metal tip and the electrode base member (or the tip base member) are fused together is connected at a center of the noble metal tip in a radial direction thereof (or in such a way that an unfused portion is not present in the radial center of the noble metal tip). However, if laser welding, such as that mentioned above, is performed by use of a related-art laser beam having a large BPP value, a portion of the area where the noble metal tip and the electrode base member (or the tip base member) are fused together, which is close to a surface, assumes a large height, which in turn makes an unfused portion of the noble metal tip shorter and may deteriorate ignitability of the spark plug.

In contrast, the manufacturing method of the present invention makes it possible to perform fusing up to a deep, narrow point because the laser beam having a small BPP value is used. Therefore, even when laser welding is performed such that the fused portion becomes connected in the radial center of the noble metal tip, an unfused portion of the noble metal tip can assure a sufficient length, and ignitability of the spark plug and exfoliation resistance of the noble metal tip can be assured.

In the above-described method for manufacturing a spark plug, a plurality of areas to be welded may be simultaneously exposed to a plurality of laser beams in the laser welding process.

In order to efficiently weld the noble metal tip and the electrode base member (or the tip base member) by means of a laser, it is desirable to simultaneously emit a plurality of laser beams to areas to be welded between the noble metal tip and the electrode base member (or the tip base member). However, when a plurality of laser beams are simultaneously emitted, the amount of heat received per unit time by the noble metal tip and the electrode base member (or the tip base member) is greater than that received when a single laser beam is emitted. For this reason, sputtering is likely to arise, and resultant sputtered substances may adhere to a lens or another member of an optical system.

In contrast, according to the manufacturing method of the present invention, a laser beam having a small BPP value is used. Hence, a laser beam output position of an optical system, and the like, can be spaced apart from a workpiece (a noble metal tip, and the like) by an amount corresponding to a focal length "f" at the time of laser welding. Therefore, even when a plurality of laser beams are simultaneously radiated on a plurality of areas to be welded, sputtered substances, which are generated during laser welding, can be readily prevented from adhering to a lens and another member of an optical system.

In the above-described method for manufacturing a spark plug, the spark plug may be a spark plug comprising: a center electrode comprising a center-pole-side electrode base member and a center-pole-side noble metal tip welded to the base member by means of a laser; and an outer electrode having an outer-electrode-side electrode base member and an outer-electrode-side noble metal tip welded to the outer-electrode-side electrode base member by means of a laser or an outer-electrode-side electrode base member, a tip base member joined thereto, and an outer-electrode-side noble metal tip welded to the tip base member by means of a laser, wherein a BPP value achieved at a time point when the laser beam used for laser-welding the outer-electrode-side electrode base member and the outer-electrode-side noble metal tip or the tip base member and the outer-electrode-side noble metal tip enters the transfer optical system is smaller than a BPP value achieved at a time point when the laser beam used for laser-welding the center-pole-side electrode base member and the center-pole-side noble metal tip enters the transfer optical system.

A spark plug is usually arranged on a cylinder head while the outer electrode protrudes toward the center of the combustion chamber than does the center electrode, and hence the outer electrode is likely to become hot when compared with the center electrode. Accordingly, in a spark plug having a noble metal tip on a center electrode and another noble metal tip on an outer electrode, exfoliation resistance of the outer-electrode-side noble metal tip must be enhanced as compared with exfoliation resistance of the center-pole-side noble metal tip.

Accordingly, in the manufacturing method of the present invention, a BPP value achieved at a time point when the laser beam used for laser-welding the outer-electrode-side electrode base member (or the tip base member) and the outer-electrode-side noble metal tip enters the transfer optical system is smaller than a BPP value achieved at a time point when the laser beam used for laser-welding the center-pole-side electrode base member and the center-pole-side noble metal tip enters the transfer optical system. Therefore, a difference between a fused portion close to a surface and a deep fused portion (in terms of a cross-sectional width) in the fused portion between the outer-electrode-side noble metal tip and the outer-electrode-side electrode base member (or the tip base member) becomes small, so that exfoliation resistance of the outer-electrode-side noble metal tip can be enhanced.

Further, in the above-described method for manufacturing a spark plug, the electrode base member may be the outer-electrode-side electrode base member, and the noble metal tip may be the outer-electrode-side noble metal tip, and in the laser welding process, the outer-electrode-side electrode base member is fixed to an end face of a metal shell of the spark plug, thereafter the laser welding is performed in a state in which the outer-electrode-side noble metal tip is placed at a predetermined position of the outer-electrode-side electrode base member that is yet to be bent and in which a laser beam emission unit of the transfer optical system which emits the laser beam toward the area to be welded is placed at a location opposite to the outer-electrode-side noble metal tip with reference to the end face of the metal shell and where an emission of the laser beam to the area to be welded is not hindered by the metal shell and the outer-electrode-side electrode base member.

In order to prevent sputtered substances, which are generated by radiation of laser, from adhering to the laser beam emission unit when the outer-electrode-side noble metal tip is welded to the outer-electrode-side electrode base member by means of a laser, it is desirable to separate the laser beam emission unit from an area to be welded. However, in the case of a laser beam having a short focal length "f," namely, a related-art laser beam having a large BPP value, when an attempt is made to assure exfoliation resistance of the outer-electrode-side noble metal tip, it is difficult to assure a long distance between the laser beam emission unit and the area to be welded.

In contrast, according to the manufacturing method of the present invention, the laser beam emission unit can be separated apart from a workpiece (a noble metal tip, and the like) by an amount corresponding to the focal length "f" during laser welding because a laser beam having a small BPP value is used. For this reason, when the outer-electrode-side noble metal tip is welded to the outer-electrode-side electrode base member by means of a laser, exfoliation resistance of the outer-electrode-side noble metal tip can be assured while adhesion of sputtered substances to the laser beam emission unit is prevented even when laser welding is performed while the laser beam emission unit is placed at a position opposite to the outer-electrode-side noble metal tip with reference to the end face of the metal shell.

Moreover, another means of solution is a method for manufacturing a spark plug, the spark plug comprising a metal shell; and an outer electrode that is made of noble metal and that is welded to the metal shell by means of a laser, the method comprising: a laser welding process for welding the metal shell to the outer electrode by use of a laser beam that has a BPP value of 25 mm·mrad (a radius·a half angle) or less at a time point when the laser beam enters a transfer optical system for guiding the laser beam to an area to be welded where laser welding is to be performed.

According to the manufacturing method of the present invention, a laser beam that has a BPP value of 25 mm·mrad (a radius·a half angle) or less achieved at a time point when the laser beam enters a transfer optical system is used in the laser welding process as a laser beam to be used at the time of an outer electrode being welded to metal shell by means of a laser. A spark plug manufactured through the laser welding process can be enhanced in terms of exfoliation resistance of the outer electrode when compared with a spark plug manufactured by use of a laser beam having a greater BPP value. Namely, a spark plug having an outer electrode whose exfoliation resistance is enhanced can be manufactured.

For example, an electrode made of noble metal that is less consumed when used is mentioned as the outer electrode made of noble metal; namely, an electrode made of Pt, Ir, or Ir doped with a rare earth oxide, a Pt—Ir alloy material, and the like.

Further, for example, low carbon steel, or the like, is mentioned as the metal shell.

Moreover, in the above-described method for manufacturing a spark plug, a step index optical fiber may be used as an optical fiber used in the transfer optical system.

When the laser welding is performed by use of a laser beam having a small BPP value, it is possible to fuse a target up to a narrow, deep point but is likely to cause sputtering. In contrast, in the manufacturing method of the present invention, a step index (SI) optical fiber is used as an optical fiber used in a transfer optical system. Hence, energy distribution of a laser beam becomes close to a uniform distribution. Therefore, an excessive increase in the energy distribution of the laser beam achieved in proximity to an optical axis, which would otherwise arise in a grated index (GI) optical fiber, is prevented, and occurrence of sputtering can be prevented.

Advantages of the Invention

A method for manufacturing a spark plug of the present invention enables enhancement of resistance to exfoliation of a noble metal tip from an electrode base member or a tip base member or resistance to exfoliation of the metal shell from an outer electrode.

BRIEF DESCRIPTION OF DRAWINGS

FIG. 8 is a schematic diagram of the spark plug of the first modification, in which FIG. 8(a) shows a side view and FIG. 8(b) shows an enlarged perspective view of an area A.

FIG. 11 is a schematic diagram of a spark plug of a second modification, in which FIG. 11(a) shows a side view and FIG. 11(b) shows an enlarged perspective view of an area B.

FIG. 12 is a diagram showing a laser welding process for welding an outer electrode to a metal shell in connection with the method for manufacturing a spark plug of the second modification, in which FIG. 12(a) shows a side view and FIG. 12(b) shows a top view achieved in direction C.

FIG. 13 is a diagram showing a state of an outer electrode being welded to the metal shell in connection with the method for manufacturing a spark plug of the second modification, in which FIG. 13(a) shows a side view and FIG. 13(b) shows a top view achieved in the direction C.

DESCRIPTION OF REFERENCE SYMBOLS 100, 200, 300: SPARK PLUG
121: CENTER ELECTRODE (ELECTRODE BASE MEMBER)
128: ELECTRODE FRONT END PORTION (AREA TO BE WELDED)
131: OUTER ELECTRODE (ELECTRODE BASE MEMBER)
134: ELECTRODE JOINING PORTION (AREA TO BE WELDED)
151: CENTER ELECTRODE TIP (NOBLE METAL TIP)
158: TIP REAR END PORTION (AREA TO BE WELDED)
161: OUTER ELECTRODE TIP (NOBLE METAL TIP)
168: TIP BASE END PORTION (AREA TO BE WELDED)
171: TIP BASE MEMBER
173: BURGE PORTION (AREA TO BE WELDED)
305: METAL SHELL
333: ELECTRODE JOINING PORTION
361: OUTER ELECTRODE
368: METAL SHELL WELDED AREA (AREA TO BE WELDED)
AX1: AXIAL LINE (OF CENTER ELECTRODE TIP)
AX2: AXIAL LINE (OF OUTER ELECTRODE TIP)
LM: MIRROR (OF TRANSFER OPTICAL SYSTEM)
PL1: FIRST LASER BEAM (LASER BEAM)
PL2: SECOND LASER BEAM (LASER BEAM)
PL3: THIRD LASER BEAM (LASER BEAM)
PL4: FOURTH LASER BEAM (LASER BEAM)

BEST MODE FOR CARRYING OUT THE INVENTION (Embodiment)

An embodiment of the present invention will be described by reference to the drawings.

Figure 1:
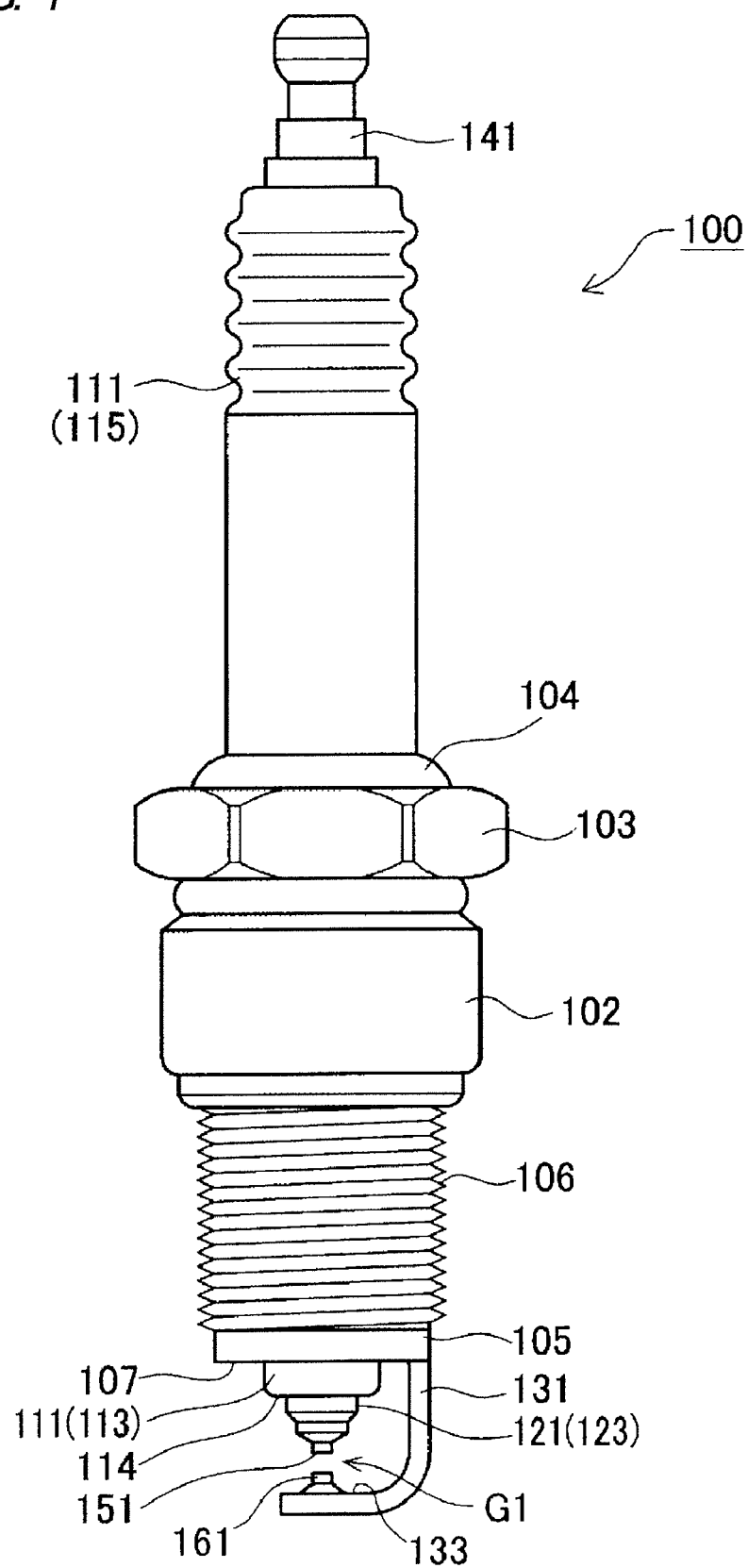
FIG. 1 is a side view of a spark plug of an embodiment.

FIG. 1 shows a side view of a spark plug 100 of the embodiment. The spark plug 100 is an internal combustion engine spark plug used while being mounted on a cylinder head of an unillustrated engine. The spark plug 100 primarily includes metal shell 105, an insulator 111, a center electrode 121, and an outer electrode 131.

The metal shell 105 assumes a cylindrical shape and is made of metal, such as low carbon steel. The metal shell 105 also has a flange 102; a tool engagement portion 103 that is situated at a position closer to a base end side with respect to the flange 102 (at an elevated position of the drawings), that allows engagement of a tool used for mounting the spark plug 100, and that assumes a hexagonal cross section; and a crimp portion 104 that is situated on a based end side of the tool engagement portion and that fixes the insulator 111 to the metal shell 105 by means of crimping. Further, a mount thread 106 that is smaller in diameter than the flange 102 and that is used for screwing the spark plug 100 to a cylinder head is provided on a periphery of an area close to a leading end (a lower area of the drawing) with respect to the flange 102.

The insulator 111 is made of aluminum-based ceramic, and the like, and an outer periphery of the insulator is surrounded by the metal shell 105. A leading end portion 113 of the insulator protrudes from a leading end face 107 of the metal shell 105 toward a leading end side (in a downward direction of the drawing), and a base end portion 115 also protrudes from the crimp portion 104 of the metal shell 105 toward the base end side (in an upward direction of the drawing). An axial hole (not shown) is formed in the insulator 111 along an axial direction (a vertical direction of the drawing). A center electrode 121 is fixedly inserted into a leading end side of the axial hole (a lower side of the drawing), whilst a terminal fitting 141 for leading a high voltage to the center electrode 121 is fixedly inserted to the base end side (a higher position of the drawing).

The center electrode 121 is held in a penetrating manner in the axial hole of the insulator 111 with a leading end portion 123 of the center electrode 121 protruding from a leading end face 114 of the insulator 111. Although not shown, the center electrode 121 include a copper core containing, as a main component, Cu with high heat conductivity and an outer layer portion that is made of an INCONEL 600 material containing Ni as a main component and that surrounds the copper core. A pillar-shaped center electrode tip 151 is joined to a leading end side of the center electrode 121 (a lower side of the drawing) by means of a laser welding. An axial line AX1 of the center electrode tip projects toward the leading end side (a downward direction of the drawing) while aligned to an axial line of the center electrode 121. The center electrode tip 151 is made of an Ir-5% Pt alloy and has a tip diameter of 0.6 mm The outer electrode 131 is made of an INCONEL 600 material including Ni as a main component and is joined at one end to the leading end face 107 of the metal shell 105, and the other end of the outer electrode is bent toward the axial line side of the center electrode 121. A pillar-shaped outer electrode tip 161 is laser-welded to an opposing surface (a tip joining surface 133) facing the center of the center electrode, and an axial line AX2 of the outer electrode tip protrudes toward the base end side (in an upward direction of the drawing) perpendicular to the tip joining surface 133. A gap between the outer electrode tip 161 and the center electrode tip 151 serves as a spark discharge gap G1 where spark discharge is generated. The outer electrode tip 161 is made of a Pt-20% Rh alloy and has a tip diameter of 0.7 mm Of the method for manufacturing the spark plug 100 of the present embodiment, a method for laser-welding the center electrode tip 151 is now described by reference to FIGS. 2 and 3.

Figure 2:
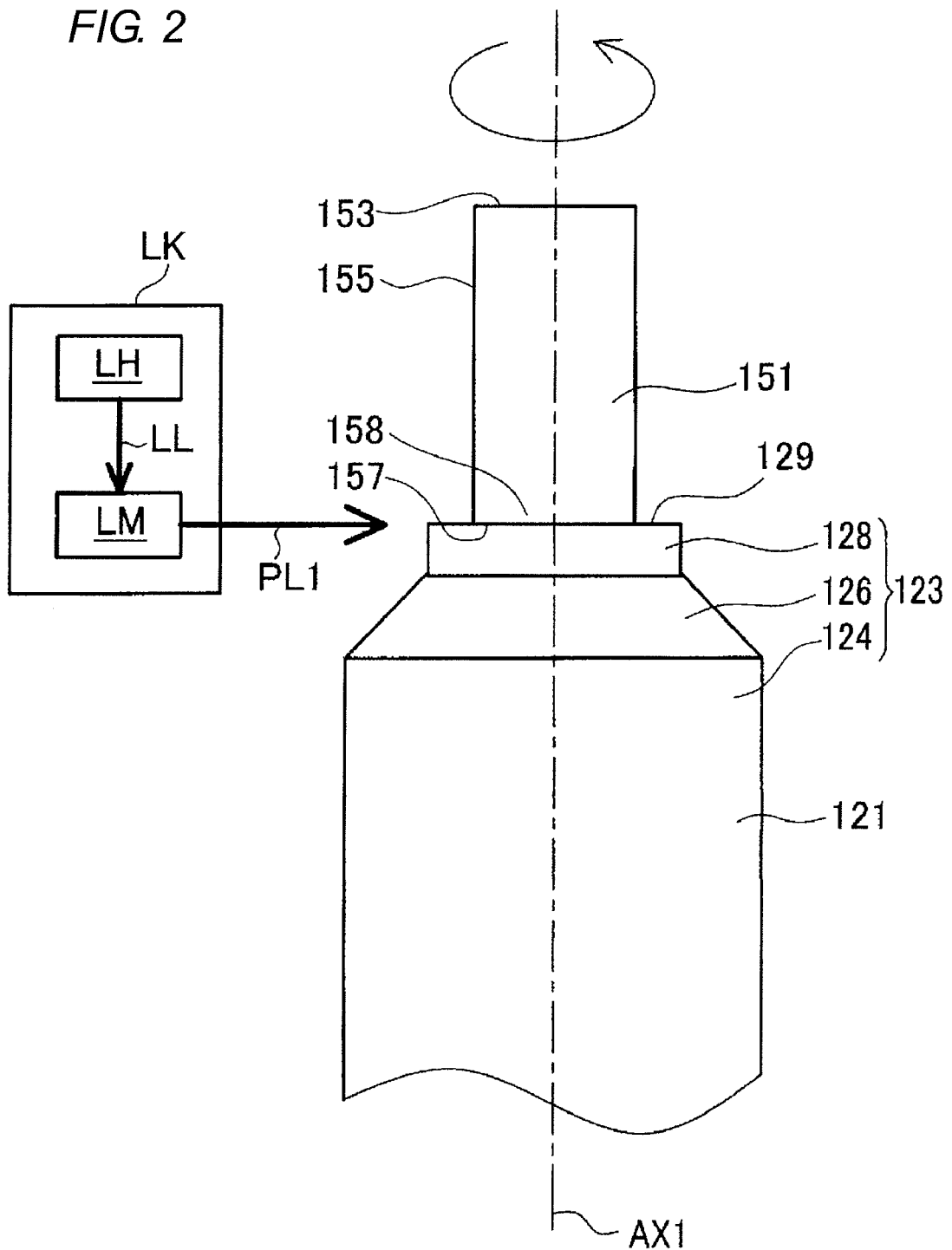
FIG. 2 is a diagram showing a laser welding process for welding a center electrode tip to a center electrode in connection with a method for manufacturing a spark plug of the embodiment.

First, the center electrode 121 made by a known technique is prepared (see FIG. 2). In the center electrode 121 that is not yet joined, the leading end portion 123 has a large diameter portion 124 situated on a base end side (at a lower position of the drawing), a small-diameter electrode front end portion 128 that is situated on the front end side (at an upper position of the drawing) and that includes a flat electrode leading end face 129, and a tapered portion 126 interposed therebetween.

Meanwhile, the center electrode tip 151 is prepared. The center electrode tip 151 that is not yet joined has a tip front end face 153, a tip base end face 157, and a tip side surface 155 connecting the tip leading end face to the tip base end face; and also assumes the shape of a pillar.

In a process for welding an entire circumference of the center electrode by means of a laser of the present embodiment, the center electrode tip 151 is first arranged in such a way that the tip base end face 157 contacts the electrode leading end face 129 and that the axial line AX1 of the center electrode tip 151 is aligned to an axial line of the center electrode 121. Next, the tip base end portion 158 of the center electrode tip 151 and the electrode leading end portion 128 of the center electrode 121 are oriented in a horizontal direction (a right-left direction of the drawing) and exposed to a first laser beam PL1, whereby the tip base end portion 158 of the center electrode tip 151 and the electrode leading end portion 128 of the center electrode 121 are fused. Thus, the center electrode tip 151 and the center electrode 121 are joined together. Specifically, a laser irradiation unit LK is fixed at a predetermined position, and the center electrode tip 151 and the center electrode 121 are rotated around the axial line AX1 and sequentially exposed to radiation of the pulse-like first laser beam PL1 (nine shots of the first laser beam). Irradiation energy of the laser pulse is 3 J/pulse. From the viewpoint of enhancement of exfoliation resistance of the center electrode tip 151, it is preferable to radiate the first laser beam PL1 in such a way that a fused portion where the center electrode tip 151 (the tip base end portion 158) and the center electrode 121 (the electrode leading end portion 128) are fused together becomes connected at the center of the center electrode tip 151 in its radial direction.

Figure 3:
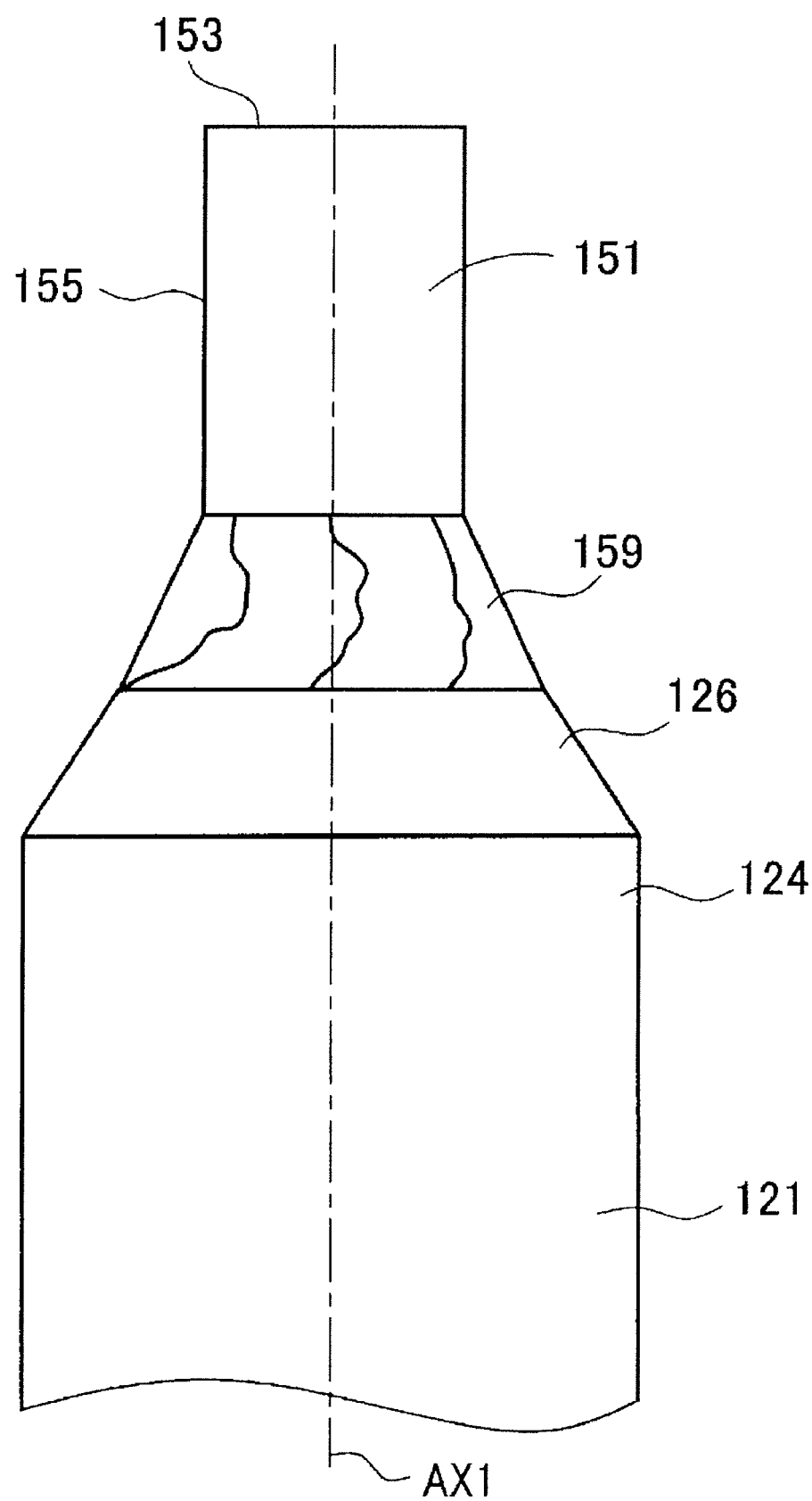
FIG. 3 is a diagram showing a state of a center electrode tip being welded to a center electrode in connection with the method for manufacturing a spark plug of the embodiment.

As a result, as shown in FIG. 3, the center electrode tip 151 is joined to the center electrode 121 by way of a first joining portion 159. The first joining portion 159 has a composition which will be generated when metals (or alloys) making up the tip base end portion 158 and the electrode leading end portion 128, which are yet to be exposed to the first laser beam PL1, are once fused and mixed together.

After the center electrode tip 151 has been joined to the center electrode 121, the center electrode 121 is attached to the separately-produced insulator 111 through assembly by means of a known technique, and the resistor and the terminal fitting 141 are also attached to the insulator 111 and subjected to glass sealing.

Moreover, the thus-assembled parts are attached to the metal shell 105 by means of the known technique, and a rod-shaped outer electrode 131b (a squared-rod-shaped outer electrode 131 that is not bent) is subsequently joined to the metal shell 105.

Of the method for manufacturing the spark plug 100, a method for welding the outer electrode tip 161 will now be described by reference to FIGS. 4 and 5.

Figure 4:
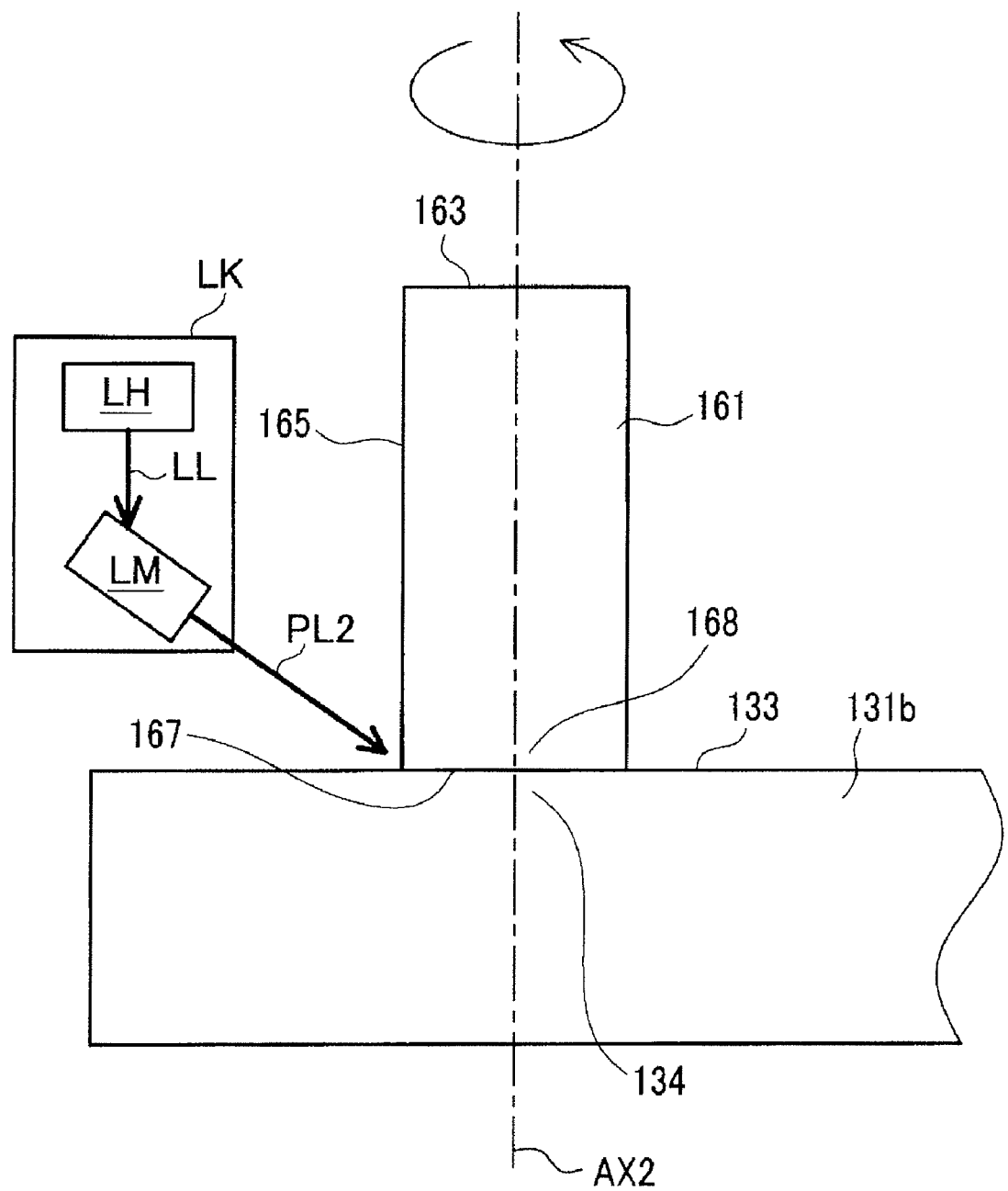
FIG. 4 is a diagram showing a laser welding process for welding an outer electrode tip to an outer electrode in connection with the method for manufacturing a spark plug of the embodiment.

First, the outer electrode tip 161 is prepared (see FIG. 4). The outer electrode tip 161 also assumes the shape of a pillar, as does the center electrode tip 151, including a tip distal end face 163, a tip base end face 167, and a tip side surface 165 connecting the faces together.

The tip base end face 167 of the outer electrode tip 161 is arranged so as to contact the tip joining surface 133 of the outer electrode 131b (see FIG. 4). Subsequently, a pulse-like second laser beam PL2 is radiated from an obliquely upper position in the drawing (a direction that forms an angle of 55° with the axial line AX2 in the embodiment) toward the tip base end portion 168 of the outer electrode tip 161 and the tip joining portion 134 of the outer electrode 131b, thereby fusing the tip base end portion 168 and the tip joining portion 134, to thus join the outer electrode tip 161 to the outer electrode 131b. Even in the process for welding the entire circumference of the outer electrode by means of a laser, the laser radiation system LK is fixed at the predetermined position, and the outer electrode tip 161 and the outer electrode 131b are rotated around the axial line AX2 and sequentially exposed to the second laser beam PL2 (nine shots of the second laser beam). Irradiation energy of the laser pulse is 4 J/pulse. From the viewpoint of enhancement of exfoliation resistance of the outer electrode tip 161, it is preferable to radiate the second laser beam PL2 in such a way that a fused portion where the outer electrode tip 161 (the tip base end portion 168) and the outer electrode 131b (the tip joining portion 134) are fused together becomes connected at the center of the outer electrode tip 161 in its radial direction.

Figure 5:
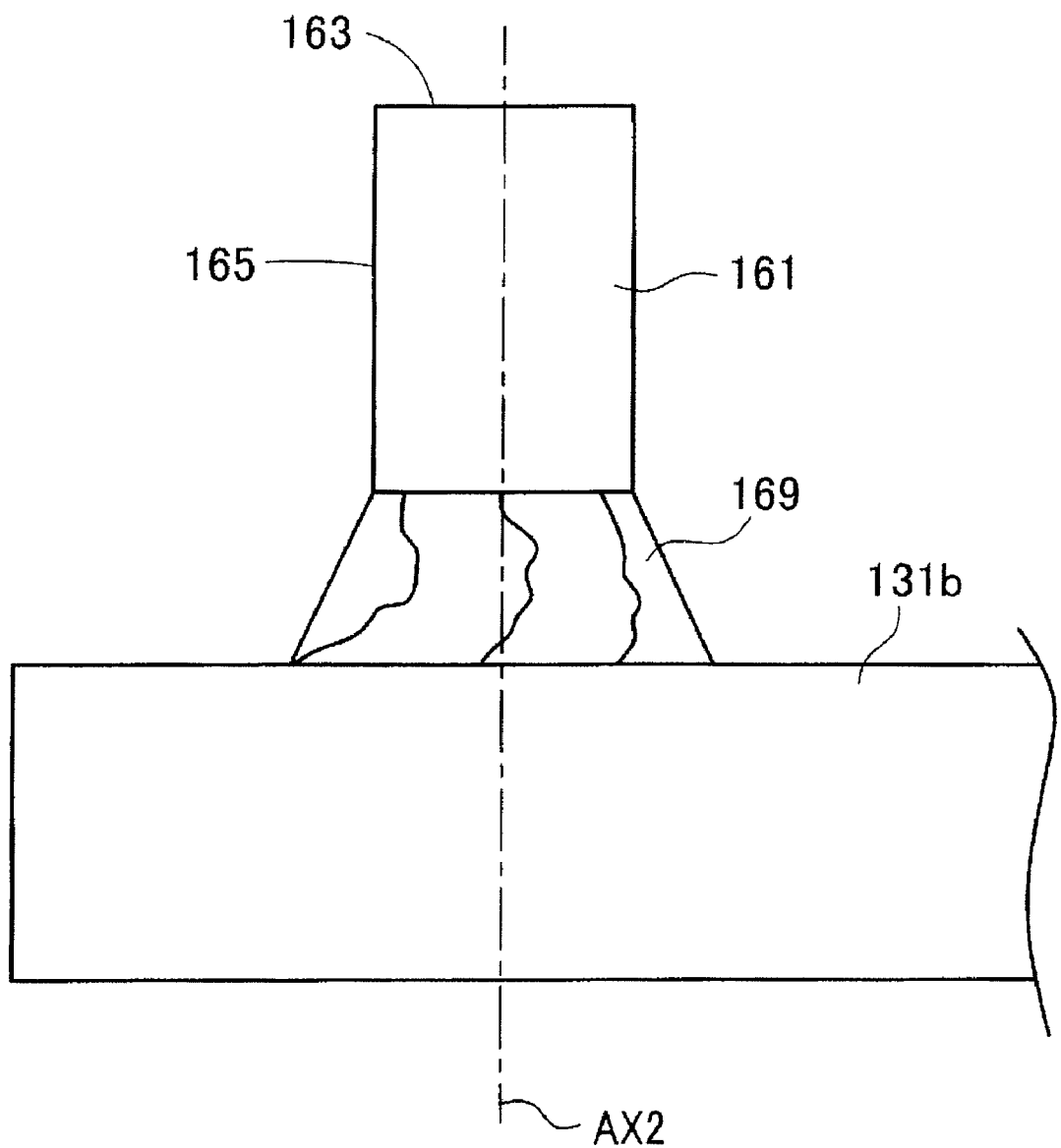
FIG. 5 is a diagram showing a state of the outer electrode tip being welded to the outer electrode in connection with the method for manufacturing a spark plug of the embodiment.

As a result, as shown FIG. 5, the outer electrode tip 161 is joined to the outer electrode 131b by way of a second joining portion 169. The second joining portion 169 has a composition which will be generated when metals (or alloys) making up the tip base end portion 168 and the tip joining portion 134, which are yet to be exposed to the second laser beam PL2, are once fused and mixed together.

Subsequently, the rod-shaped outer electrode 131b is bent by a known technique, to thus produce the outer electrode 131, and the outer electrode tip 161 is caused to oppose the center electrode tip 151 with the spark discharge gap G1 interposed therebetween. The spark plug 100 is thus completed.

In relation to the sparkplug 100 manufactured by the manufactured method of the present embodiment, a relationship between a BPP value of a laser beam used for laser welding and exfoliation resistance of the center electrode tip 151 or the outer electrode tip 161 is verified.

First, there are prepared laser irradiation units (of five types) LK that are of the same YAG laser irradiation units (laser processing machines) LK but emit the laser beams PL1 and PL2 of different BPP values. As described above, the spark plug 100 is manufactured by subjecting the center electrode tip 151 or the outer electrode tip 161 to laser welding.

Each of the laser irradiation units LK is configured so as to transfer a laser beam emitted from a laser oscillator LH (a laser beam that is yet to enter a transfer optical system) LL by means of a mirror LM serving as a transfer optical system, thereby guiding the laser beams PL1 and PL2 to areas to be welded (the tip base end portion 158 and the electrode leading end portion 128 or the tip base end portion 168 and the tip joining portion 134 in the present embodiment) (see FIGS. 2 and 4).

The respective laser irradiation units LK emit the laser beams PL1 and PL2 of the same wavelength (1.064 μm) as a YAG laser; however, the laser beams PL1 and PL2 differ from each other in terms of a BPP value as mentioned previously. Specifically, the laser beam LL that has not yet entered the mirror LM assumes five types of BPP values; namely, 8, 16, 25, 40, 100 mm·mrad.

BPP values used for evaluating performance (rating) of the laser oscillator LH are used as BPP values of the laser beams LL. In other respects, BPP values of the laser beams LL can also be actually measured by means of a BeamStar Fx manufactured by OPHIR Co., Ltd.

Spark plugs 100 thus manufactured by use of the five types of laser beams LL (PL1, PL2) were subjected to a temperature cycle test. Specifically, the spark plug 100 was mounted on an L6 engine (a piston displacement of 2000 cc and a four-valve DOHC). The engine was continually maintained at an idle (an accelerator was disengaged) and a state of about 6000 rpm (full-throttle acceleration) for one minute by turns. The test was consecutively repeated for 100 hours. Subsequently, the spark plug 100 was taken out of the engine, and the center electrode tip 151 and the outer electrode tip 161 were examined, to thus determine a rate of exfoliation.

Specifically, the center electrode tip 151 and the center electrode 121 are first cut along a plane that runs along the axial line AX1 of the center electrode tip 151, and resultant cross sections are subjected to etching. Subsequently, a joining surface between the center electrode tip 151 and the center electrode 121 in the cross section is observed, thereby determining the length achieved along a direction orthogonal to the axial line AX1 of the center electrode tip 151 of the length of an exfoliated area. A ratio of a total length of the exfoliated area to the length of an exfoliation achieved in the direction orthogonal to the axial line AX1 of the center electrode tip 151 (a total length achieved in the direction orthogonal to the axial line AX1 of the center electrode tip 151, of the length of the exfoliated area) is computed as a rate of exfoliation of the center electrode tip 151.

The same also applies to the outer electrode tip 161. The outer electrode tip 161 and the outer electrode 131 are cut along a plane running along the axial line AX2 of the outer electrode tip 161, and resultant cross sections are subjected to etching. Subsequently, in relation to a joining surface between the outer electrode tip 161 and the outer electrode 131 in the cross section, a ratio of the length of an exfoliated area to the length of an exfoliation achieved along the direction orthogonal to the axial line AX2 of the outer electrode tip 161 is computed as an exfoliation rate of the outer electrode tip 161.

Figure 6:
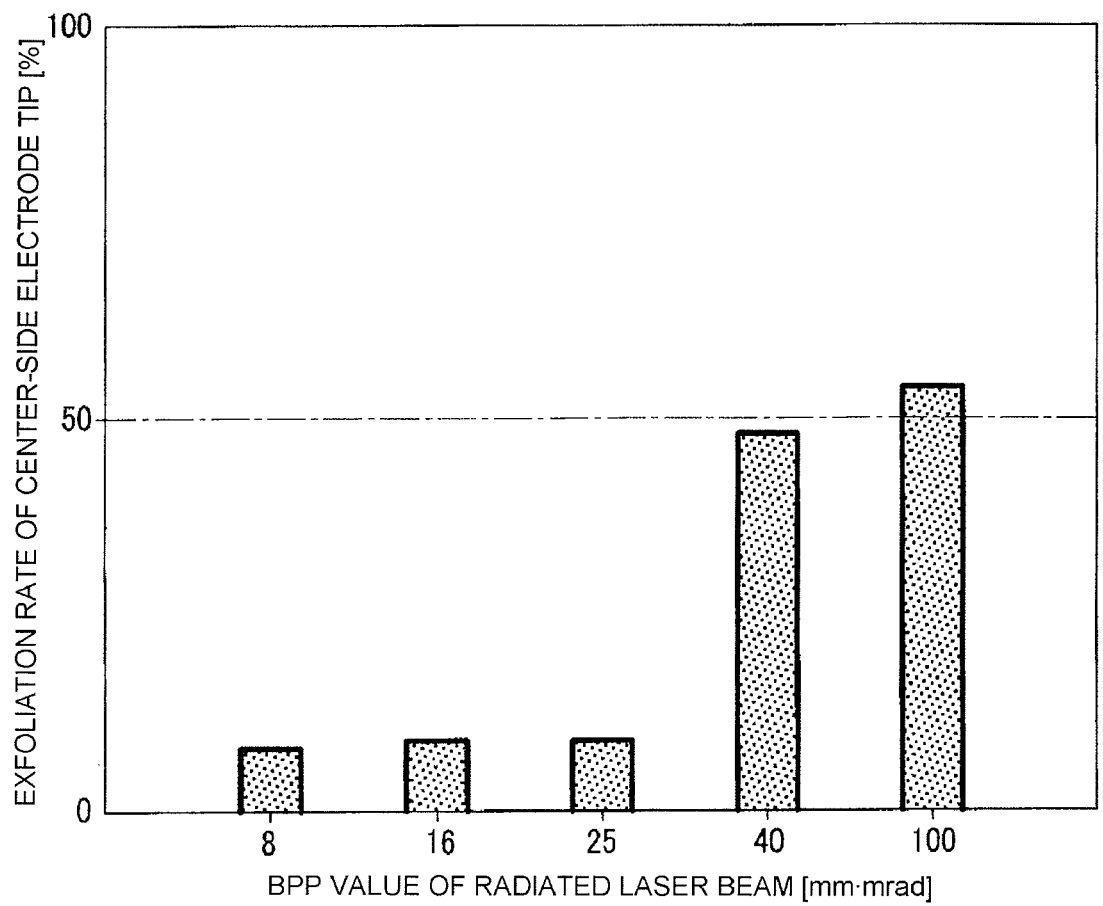
FIG. 6 is a graph showing a correlation between a rate of exfoliation of the center electrode tip of the embodiment and a BPP value of a radiated laser beam.

FIG. 6 is a graph showing a relationship between the BPP values of the laser beams LL used for welding and the exfoliation rate of the center electrode tip 151 achieved after the foregoing thermal cycle tests. According to the graph, the spark plugs 100 welded by use of the laser beams LL having BPP values of 25 mm·mrad (a radius·a half angle) or less provide a value of about 10% in connection with an exfoliation rate of the center electrode tip 151. Meanwhile, it turns out that, when the laser beams LL having greater BPP values are used, the exfoliation rate abruptly increases to about 50%. A beam divergence angle achieved during convergence of light can be made narrow by use of the laser beams LL (PL1 and PL2) having smaller BPP values, so that changes in beam size achieved in front of and behind a focal point can be reduced. Accordingly, the center electrode tip 151 and the center electrode 121 are fused up to a narrow, deep point. As a result, a difference between an area close to a surface and a deep area in terms of the nature of a fused portion (the width of a cross section) becomes smaller, which is conceived to contribute to a reduction in the exfoliation rate. In particular, when noble metal and a Ni alloy, and the like, which differ from one another in terms of thermal expansion are joined together, adoption of such a configuration is considered to be preferable. Therefore, the results show that it is better to weld the center electrode tip 151 by use of the laser beams LL whose BPP values are 25 mm·mrad (a radius·a half angle) or less during the process of the present embodiment for welding the entire circumference of a center electrode by means of a laser.

Figure 7:
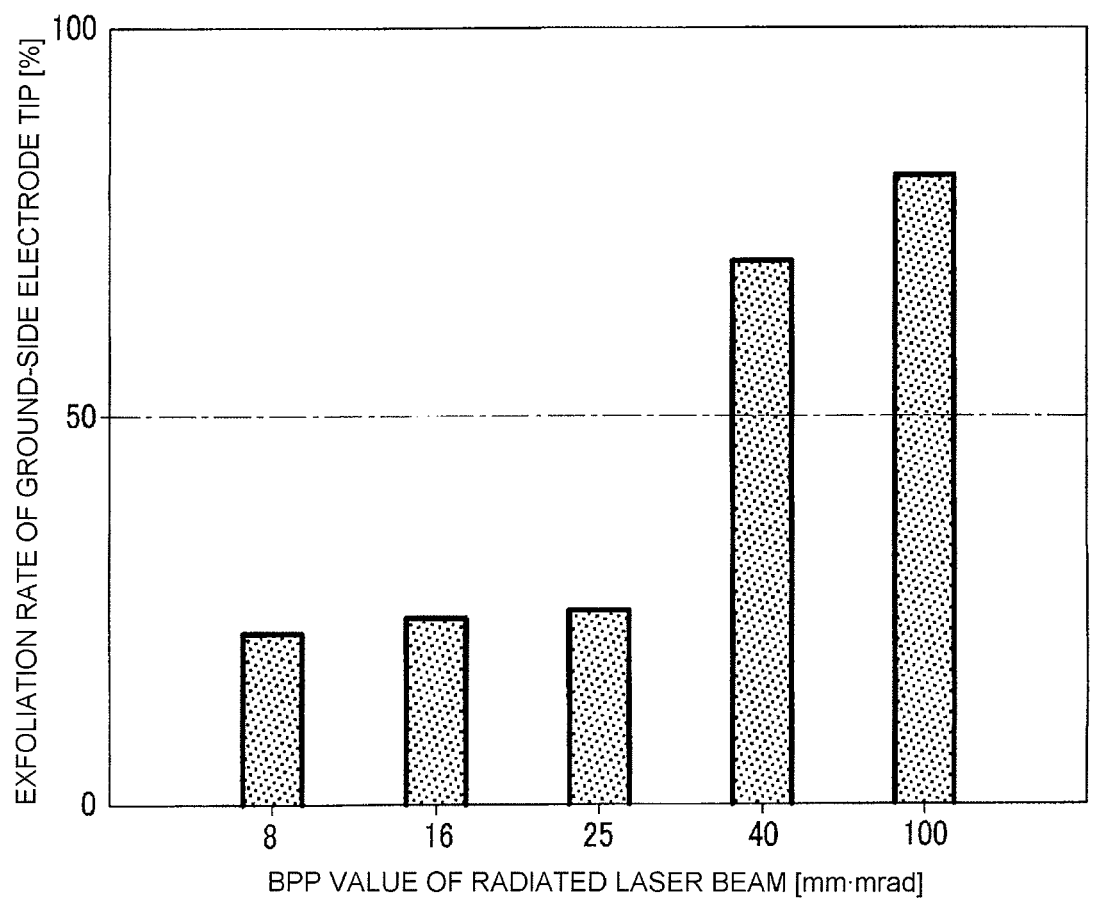
FIG. 7 is a graph showing a correlation between a rate of exfoliation of the outer electrode tip of the embodiment and a BPP value of a radiated laser beam.

Next, FIG. 7 is a graph showing a relationship between the BPP values of the laser beams LL used for welding and the exfoliation rate of the outer electrode tip 161 achieved after the thermal cycle test. According to the graph, the spark plugs 100 welded by means of the laser beams LL having BBP values of 25 mm·mrad (a radius·a half angle) or less show a value of about 25% in connection with the exfoliation rate of the outer electrode tip 161. In the meantime, it turns out that, when the laser beams LL of greater BBP values are used, the exfoliation rate increases to 70% or more. Therefore, the results show that it is better to weld the outer electrode tip 161 by use of the laser beams LL whose BPP values are 25 mm·mrad (a radius·a half angle) or less during the process of the present embodiment for welding the entire circumference of an outer electrode by means of a laser.

Further, in the present embodiment, the entire circumference of the center electrode tip 151 (the tip base end portion 158) and the entire circumference of the outer electrode tip 161 (the tip base end portion 168) are exposed to the pulse-like laser beams PL1 and PL2 during welding operation. Specifically, under the method for manufacturing the spark plug 100 of the present embodiment, the entire circumference of the center electrode tip 151 or the entire circumference of the outer electrode tip 161 is laser-welded by means of the pulse-like laser beams PL1 and PL2 into which the laser beams LL that have small BPP values and that can enhance exfoliation resistance are guided. Hence, the spark plug 100 in which the center electrode tip 151 and the outer electrode tip 161 are enhanced in terms of exfoliation resistance can be manufactured.

The outer electrode 131 is prone to have a higher temperature than is the center electrode 121. Hence, in order to enhance exfoliation resistance of the outer electrode tip 161, it is better to make the BPP value of the laser beam used for laser-welding the outer electrode tip 161 smaller than the BPP value of the laser beam used for welding the center electrode tip 151. For example, the BPP value of the laser beam used for laser-welding the outer electrode tip 161 can be set to 8 mm·mrad (a radius·a half angle), and the BPP value of the laser beam used for laser-welding the center electrode tip 151 can be set to 16 mm·mrad (a radius·a half angle).

(First Modification)

A method for manufacturing a spark plug of a first modification is now described by reference to FIGS. 8 to 10.

A spark plug 200 manufactured under the manufacturing method of the first modification differs from the spark plug 100 in that the outer electrode tip 161 is joined to the outer electrode 131 by way of a tip base member 171, but they are analogous to each other in other respects.

Therefore, explanations are provided primarily to the difference, and repeated explanations of similar elements are omitted or simplified; however, the similar elements shall yield similar working-effects. Like elements are described by use of like reference numerals.

Figure 8:
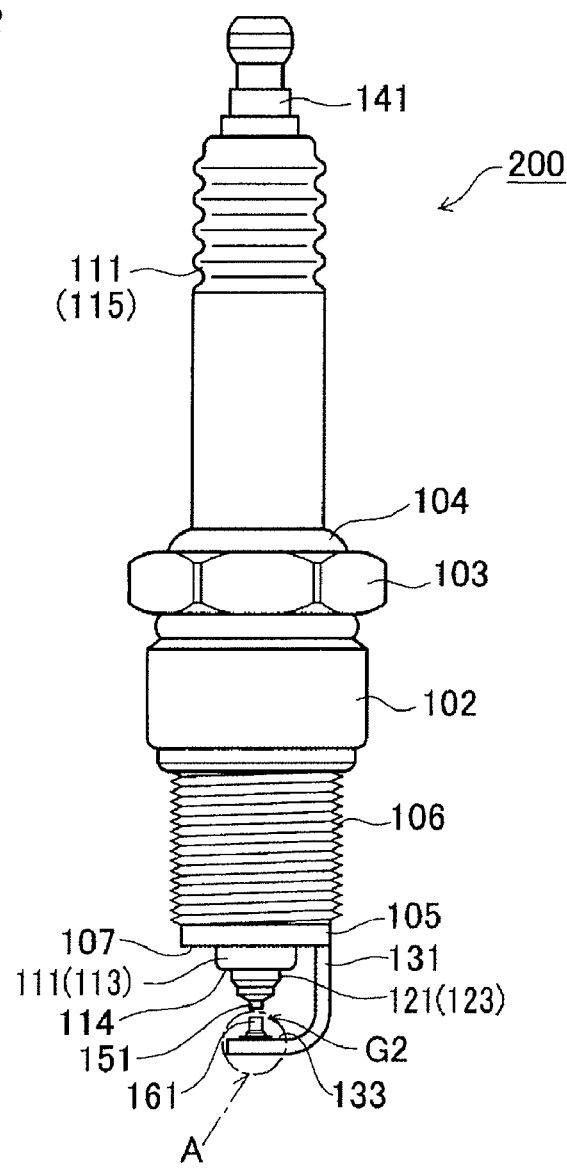
Figure 8:
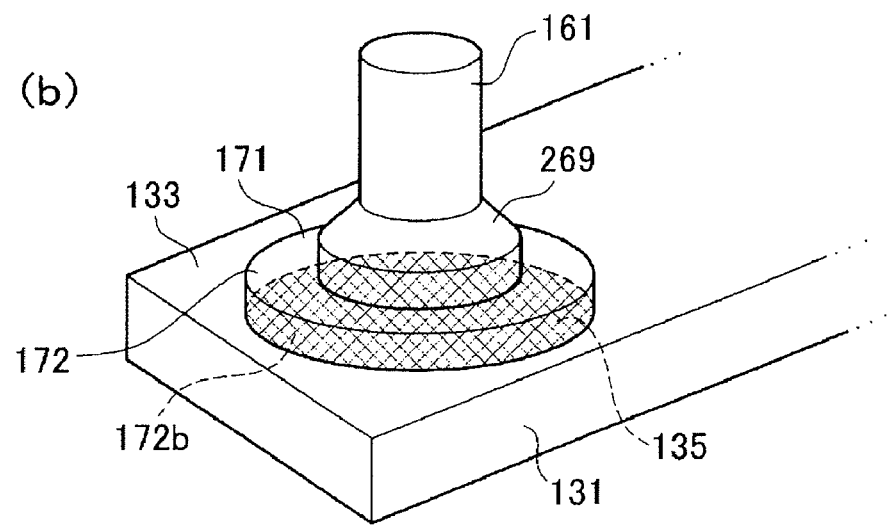
Figure 9:
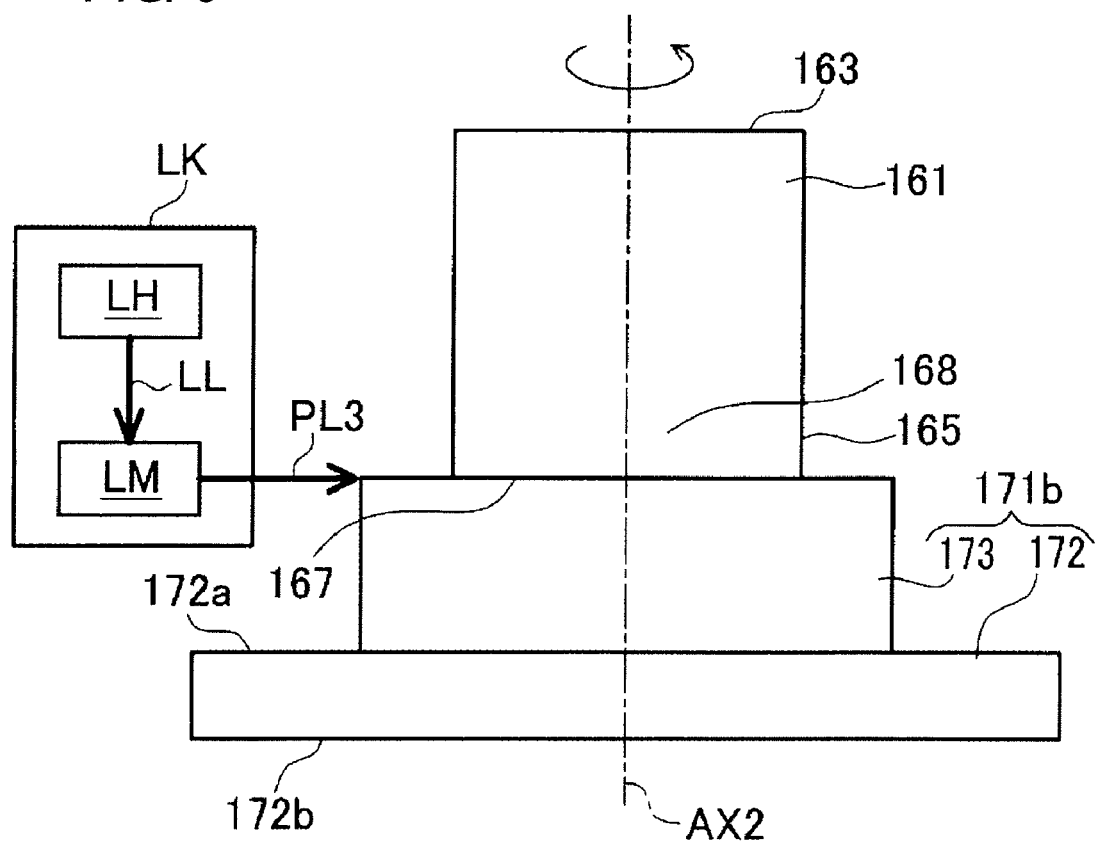
FIG. 9 is a diagram showing a laser welding process for welding an outer electrode tip to a tip base member in connection with the method for manufacturing a spark plug of a first modification.

FIG. 8 is a general view of the spark plug 200 manufactured under the manufacturing method of the first modification.

The tip base member 171 has a disc-shaped seat 172 that is larger in diameter than the outer electrode tip 161 (see FIG. 8(b)) and is made of an INCONEL 600 material including Ni as a main component. The pillar-shaped outer electrode tip 161 is welded to the tip base member 171 by means of a laser. An axis of a disc of the tip base member 171 is aligned to the axial line AX2 of the outer electrode tip 161. A gap between the outer electrode tip 161 and the center electrode tip 151 serves as a spark discharge gap G2 where spark discharge is to be caused. A bottom surface 172*b* of the seat 172 (the tip base member 171) is joined to a base member joining surface 135 of the outer electrode 131 by means of resistance welding.

The method for manufacturing the spark plug 200 of the first modification is now described by reference to FIGS. 9 and 10.

As mentioned above, the method is analogous to that described in connection with the embodiment except the process for manufacturing the outer electrode.

In the first modification, a tip base member 171*b* that is yet to be exposed to laser as well as the outer electrode tip 161 analogous to that described in connection with the embodiment (having a tip diameter of: 0.7 mm) are first prepared in the process for laser-welding the entire circumference of a tip base member. The tip base member 171*b* that is yet to be exposed to laser has the foregoing seat 172 and a bulge portion 173 that is placed on an upper surface 172*a* of the seat 172 and that assumes the shape of a convex disc. The diameter of the bulge portion 173 is 0.8 mm Arrangement is made in such a way that the tip base end face 167 contacts the bulge portion 173 and that the axial line AX2 of the outer electrode tip 161 coincides with the axial line of the tip base member 171*b*. A pulse-like third laser beam PL3 is emitted toward the bulge portion 173 and the tip base end portion 168 of the outer electrode tip 161 from a horizontal direction in the drawing, thereby fusing the bulge portion 173 and the tip base end portion 168, to thus join the outer electrode tip 161 to the tip base member 171*b*. Even in the process of welding the entire circumference to the tip base member by means of a laser, the laser irradiation unit LK is fixed to a predetermined position, and the outer electrode tip 161 and the tip base member 171*b* are rotated around the axial line AX2 and sequentially exposed to the third laser beam PL3 (18 shots of the laser beam). Irradiation energy of the laser pulse is 1 J/pulse. From the viewpoint of enhancement of exfoliation resistance of the outer electrode tip 161, it is preferable to radiate the third laser beam PL3 in such a way that a fused portion where the outer electrode tip 161 (the tip base end portion 168) and the tip base member 171*b* (the bulge portion 173) are fused together becomes connected at the center of the outer electrode tip 161 in its radial direction.

The BPP value of the third laser beam PL3 that is achieved before the laser beam LL is emitted from the laser oscillator LH enters the mirror LM is set to 25 mm·mrad (a radius·a half angle) or less.

Figure 10:
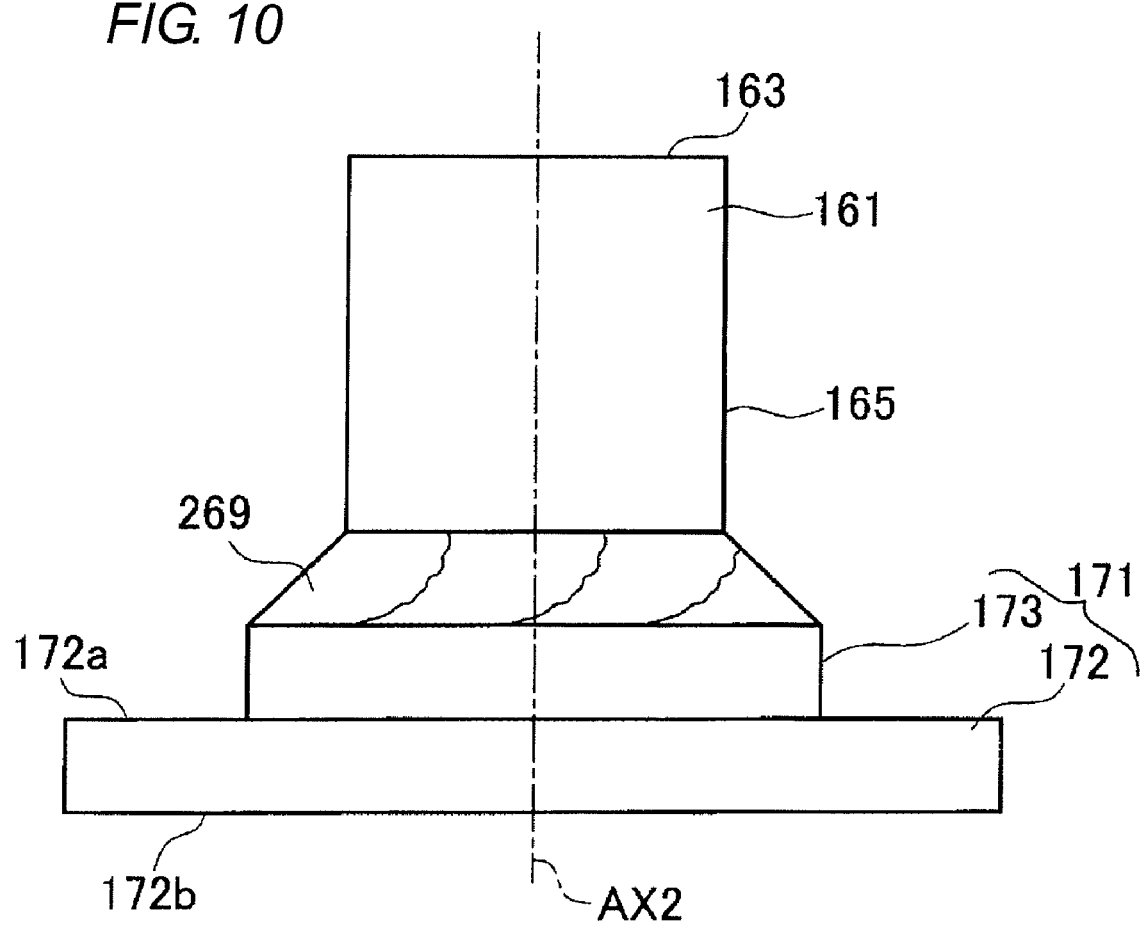
FIG. 10 is a diagram showing a state of the outer electrode tip being welded to the tip base member in connection with the method for manufacturing a spark plug of the first modification.

Thus, as shown in FIG. 10, the outer electrode tip 161 is joined to the tip base member 171 by way of a third joining portion 269. The third joining portion 269 has a composition which will be generated when metals (or alloys) making up the tip base end portion 168 and the bulge portion 173, which are yet to be exposed to the third laser beam PL3, are once fused and mixed together.

After the foregoing process for welding the entire circumference of the tip base member by means of a laser, a bottom surface 172*b* of the tip base member 171 joined to the outer electrode tip 161 is put on top of the base member joining surface 135 of the outer electrode 131, and they are subjected to resistance welding, whereby the tip base member 171 is joined to the outer electrode 131.

Subsequent processes are analogous to processes that follow the process for welding the entire circumference of an outer electrode of the embodiment by means of a laser. Thus, the spark plug 200 is completed.

Even in the first modification, the outer electrode tip 161 and the tip base member 171 are welded together by use of a laser beam LL (PL3) having a BPP value of 25 mm·mrad (a radius·a half angle) or less in the process for welding the entire circumference of a tip base member by means of a laser; hence, the exfoliation rate can be reduced.

Further, in the first modification, the entire circumference of the outer electrode tip 161 (the tip base end portion 168) is exposed to the pulse-like third laser beam PL3 during welding of the outer electrode tip. Namely, under the method for manufacturing the spark plug 200 of the first modification, the entire circumference of the outer electrode tip 161 is laser-welded by means of the pulse-like third laser beam PL3 produced by introduction of the laser beam LL that can enhance exfoliation resistance and that has a small BPP value. Hence, the spark plug 200 in which the exfoliation resistance of the outer electrode tip 161 is reliably enhanced can be manufactured.

(Second Modification)

A second modification of the present invention will now be described by reference to the drawings.

A spark plug 300 manufactured under a method for manufacturing a spark plug of the second modification differs from the spark plugs 100 and 200 of the embodiment and the modification in that a rod-shaped outer electrode 361 made of noble metal is joined to a metal shell 305 so as to obliquely protrude and that the center electrode 121 does not protrude in excess of a leading end face 307 of the metal shell 305. In other respects, the spark plugs are analogous to each other.

Therefore, explanations are provided primarily to the difference, and repeated explanations of similar elements are omitted or simplified; however, the similar elements shall yield similar working-effects. Like elements are described by use of like reference numerals.

Figure 11:
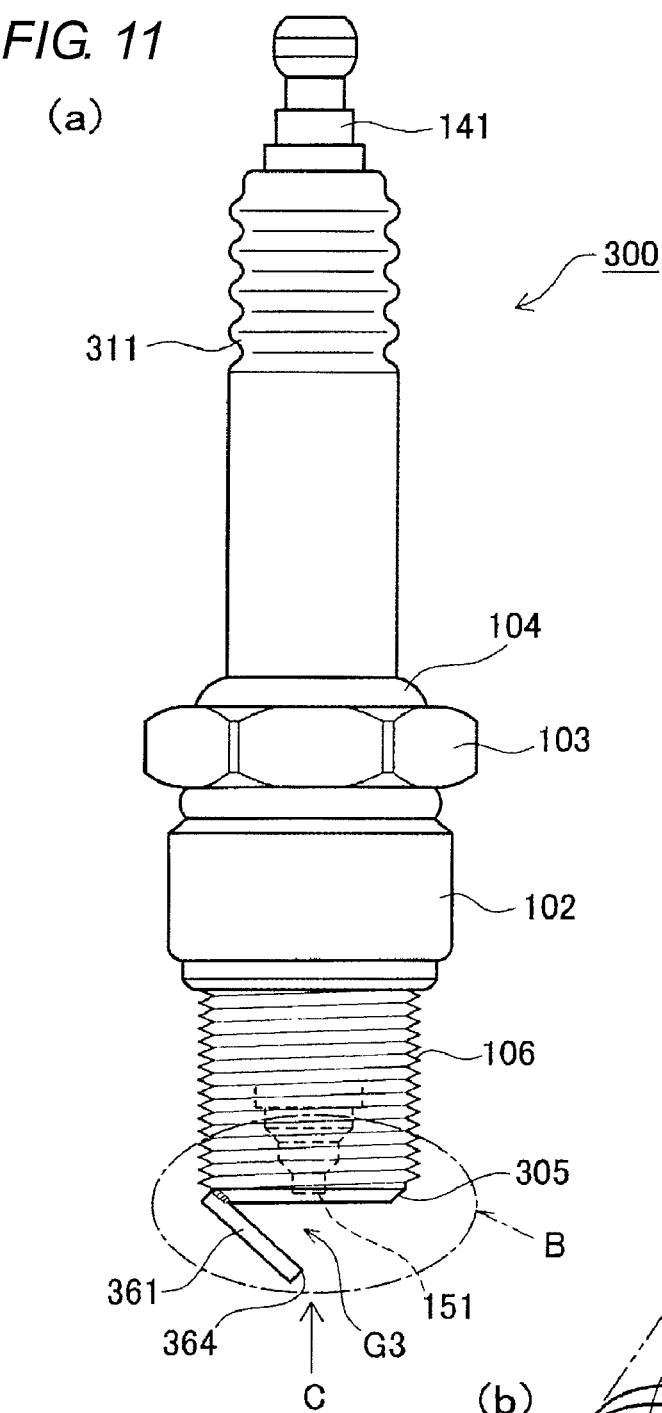
Figure 11:
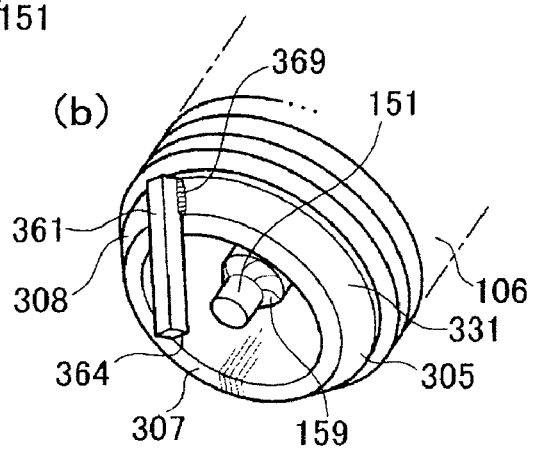

FIG. 11 shows the spark plug 300 manufactured in the second modification. As mentioned above, the spark plug 300 differs from its counterpart of the embodiment in that the rod-shaped outer electrode 361 made of noble metal is caused to obliquely project from the metal shell 305. The spark plug also differs from its counterpart of the embodiment in that an insulator 311 is made shorter than the insulator 111 of the embodiment and that the insulator 311, the center electrode 121, and the center electrode tip 151 do not project out of the metal shell 305 from the leading end face 307 of the metal shell 305.

The metal shell 305 is made of metal, such as low carbon steel, and an exterior surface 331 of a leading end portion 308 of the metal shell 305 makes up a tapered surface that becomes gradually narrower toward an end. A rod-shaped outer electrode 3611 is welded to the exterior surface 331 by means of a laser. A gap between a distal end portion 364 of the outer electrode 3611 and the center electrode tip 151 works as a spark discharge gap G3 where spark discharge is generated.

The method for manufacturing the spark plug 300 of the second modification will now be described by reference to FIGS. 12 and 13. Since the method for manufacturing the center electrode tip 151 is the same as that described in connection with the embodiment, its repeated explanation is omitted.

Figure 12:
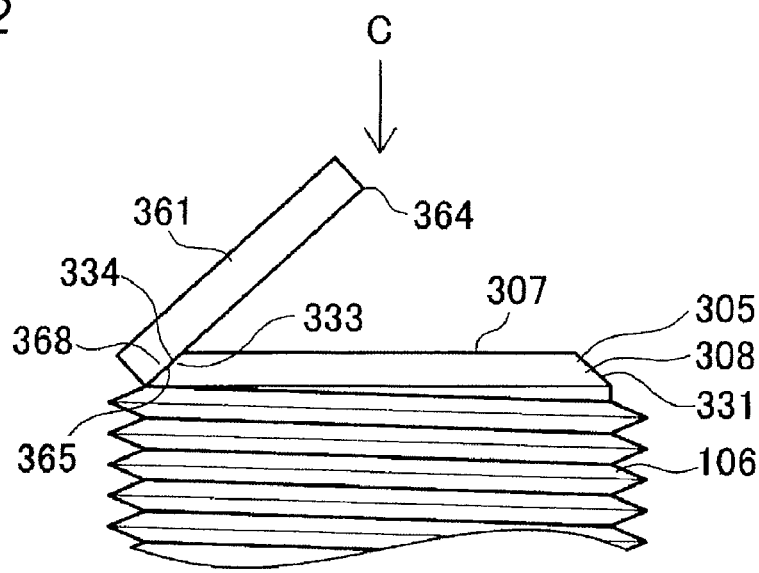
Figure 12:
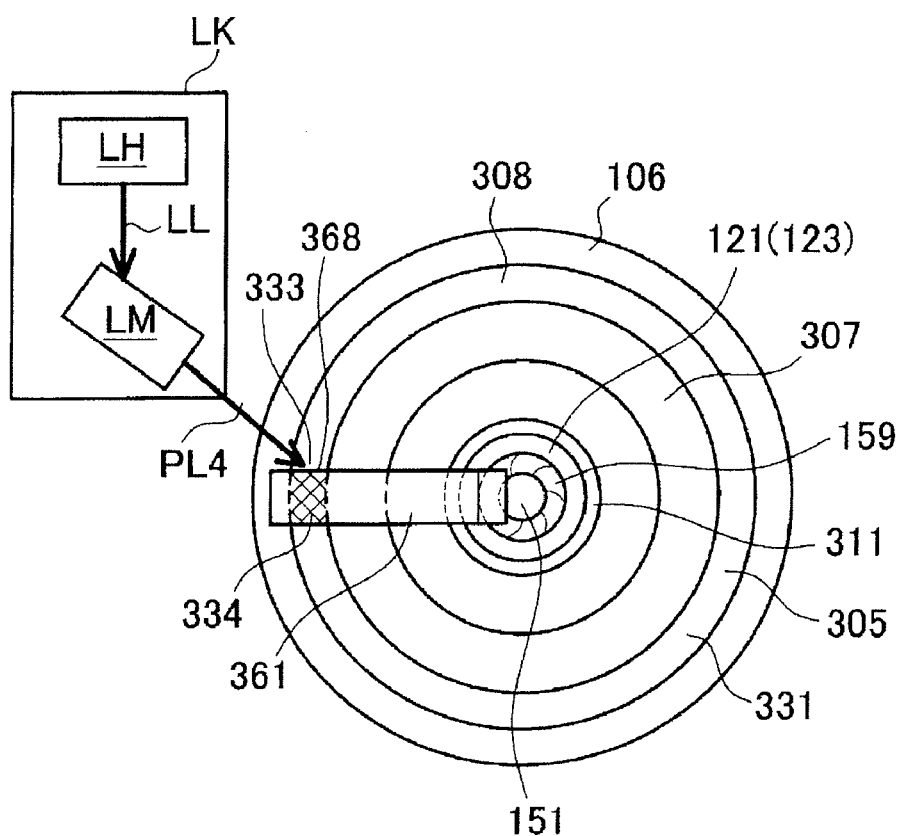

In FIG. 12, the metal shell 305 has the aforementioned exterior surface 331, and a portion of the exterior surface 331 serves as an electrode joining surface 334 to be joined to the outer electrode 361. An area around the electrode joining surface 334 is taken an electrode joining portion 333 that is exposed directly to a laser beam (a fourth laser beam PL4) in the process of welding an outer electrode by means of a laser. The outer electrode 361 has a metal shell joining surface 365 that contacts the electrode joining surface 334 of the metal shell 305. An area around the metal shell joining surface 365 is taken as a metal shell joining portion 368 that directly undergoes the fourth laser beam PL4.

In the process for welding an outer electrode by means of a laser, the outer electrode 361 is arranged with respect to the metal shell 305 in such a way that the metal shell joining surface 365 of the outer electrode 361 contacts the electrode joining surface 334 of the main hard 305 (see FIG. 12(*a*)). In FIG. 12(*b*), the pulse-like fourth laser beam PL4 is emitted toward the metal shell joining portion 368 of the outer electrode 361 and the electrode joining portion 333 of the metal shell 305 from an upper oblique direction, thereby fusing the metal shell joining portion 368 and the electrode joining portion 333 together, to thus join the outer electrode 361 to the metal shell 305. In relation to the fourth laser beam PL4, the BPP value of the laser beam LL entering the mirror LM is set to 25 mm·mrad (a radius·a half angle) or less.

Figure 13:
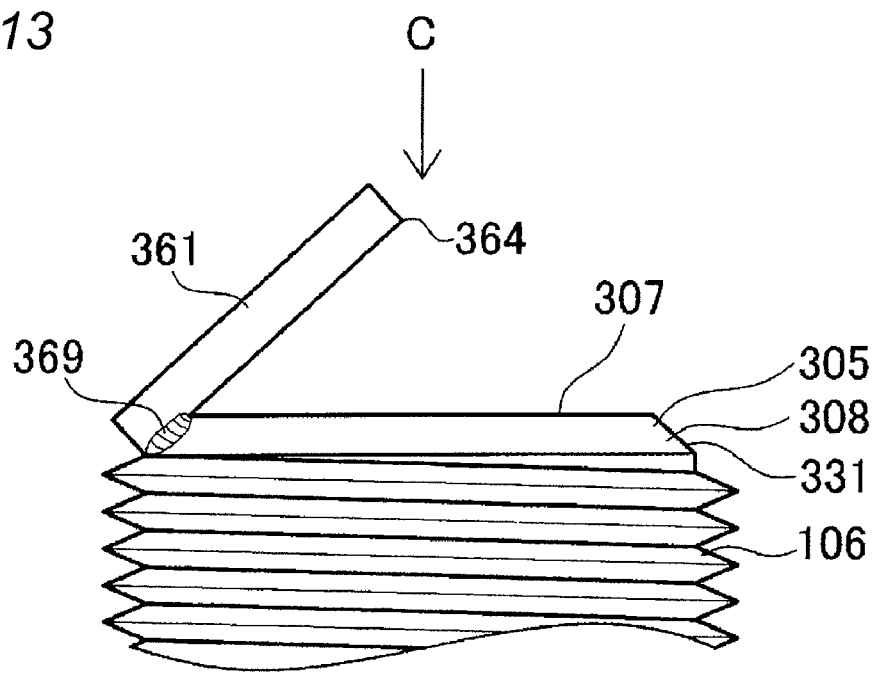
Figure 13:
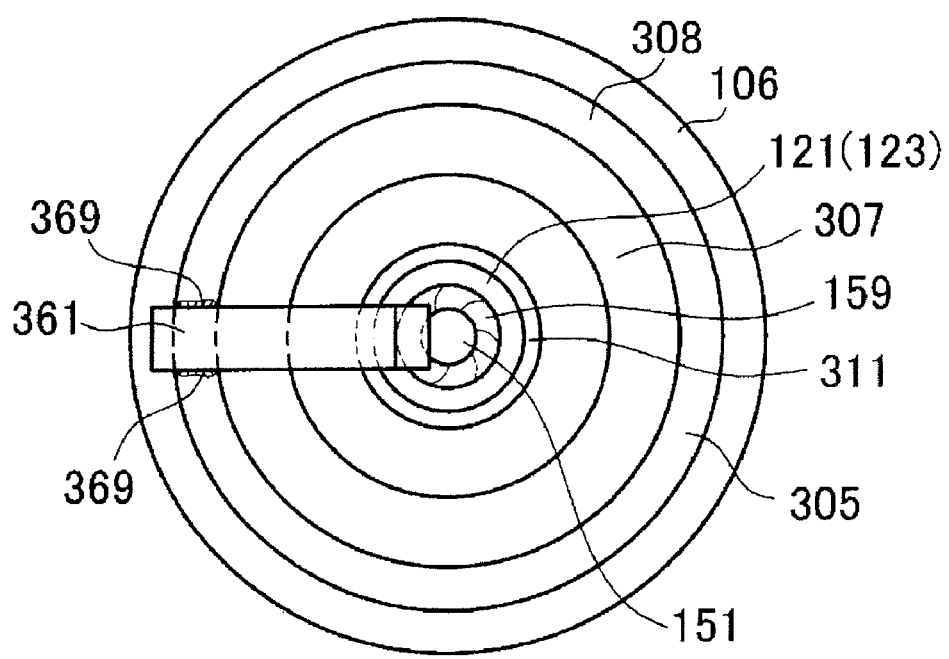

Thus, as shown in FIG. 13, the outer electrode 361 is joined to the metal shell 305 by way of a fourth joining portion 369. The fourth joining portion 369 has a composition which will be generated when metals (or alloys) making up the metal shell joining portion 368 and the electrode joining portion 333, which are yet to be exposed to the fourth laser beam PL4, are once fused and mixed together.

Processes following the process for welding metal shell by means of a laser are the same as processes that follow the process for welding the entire circumference of an outer electrode by means of a laser of the embodiment. Thus, the spark plug 300 is completed.

Even in the second modification, the outer electrode 361 and the metal shell 305 are welded together by use of a laser beam LL having a BPP value of 25 mm·mrad (a radius·a half angle) or less in the process for welding an outer electrode by means of laser, hence, the exfoliation rate of the outer electrode 361 can be reduced.

Although the present invention has been described above by reference to the embodiment, the first modification, and the second modification, it goes without saying that the present invention is not limited to the embodiment, and others, and is applicable while being changed as appropriate without departing from its drift.

For example, the method for manufacturing a spark plug having a center electrode tip welded to a center electrode and an outer electrode tip welded to an outer electrode has been exemplified in the embodiment. However, the form of the spark plug to which the present invention can be applied is not limited to the exemplified spark plug. For example, the present invention can also be applied to a spark plug having an electrode tip solely on the center electrode or to a spark plug having an electrode tip provided solely on an outer electrode.

The present invention can also be applied to a method for manufacturing a spark plug by welding a center electrode tip to a tip base member by means of a laser and welding the tip base member to the center electrode by means of resistance welding, to thus join the center electrode tip indirectly to the center electrode.

In the embodiment and others, the laser irradiation unit LK transfers the laser beam LL emitted from the laser oscillator LH by means of the mirror LM serving as a transfer optical system. However, it is also possible to use a step index (SI) optical fiber for the transfer optical system, thereby transferring and guiding light to an area to be welded. Occurrence of sputtering can thereby be inhibited even when a laser beam having a small BPP value is used.

Although one laser beam is emitted to one area to be welded in the embodiment, a plurality of laser beams can also be emitted simultaneously to a plurality of areas to be welded. Specifically, laser welding can also be performed by simultaneously emitting laser beams from two opposite directions by way, for example, of the center electrode tip 151. Thereby, laser welding can efficiently be performed. Since a laser beam having a small BPP value is used, a laser beam output position of an optical system, and the like, can be spaced from a workpiece (a noble metal tip, and the like), whereby adhesion of sputtered substances to members of the optical system can be prevented.

Figure 14:
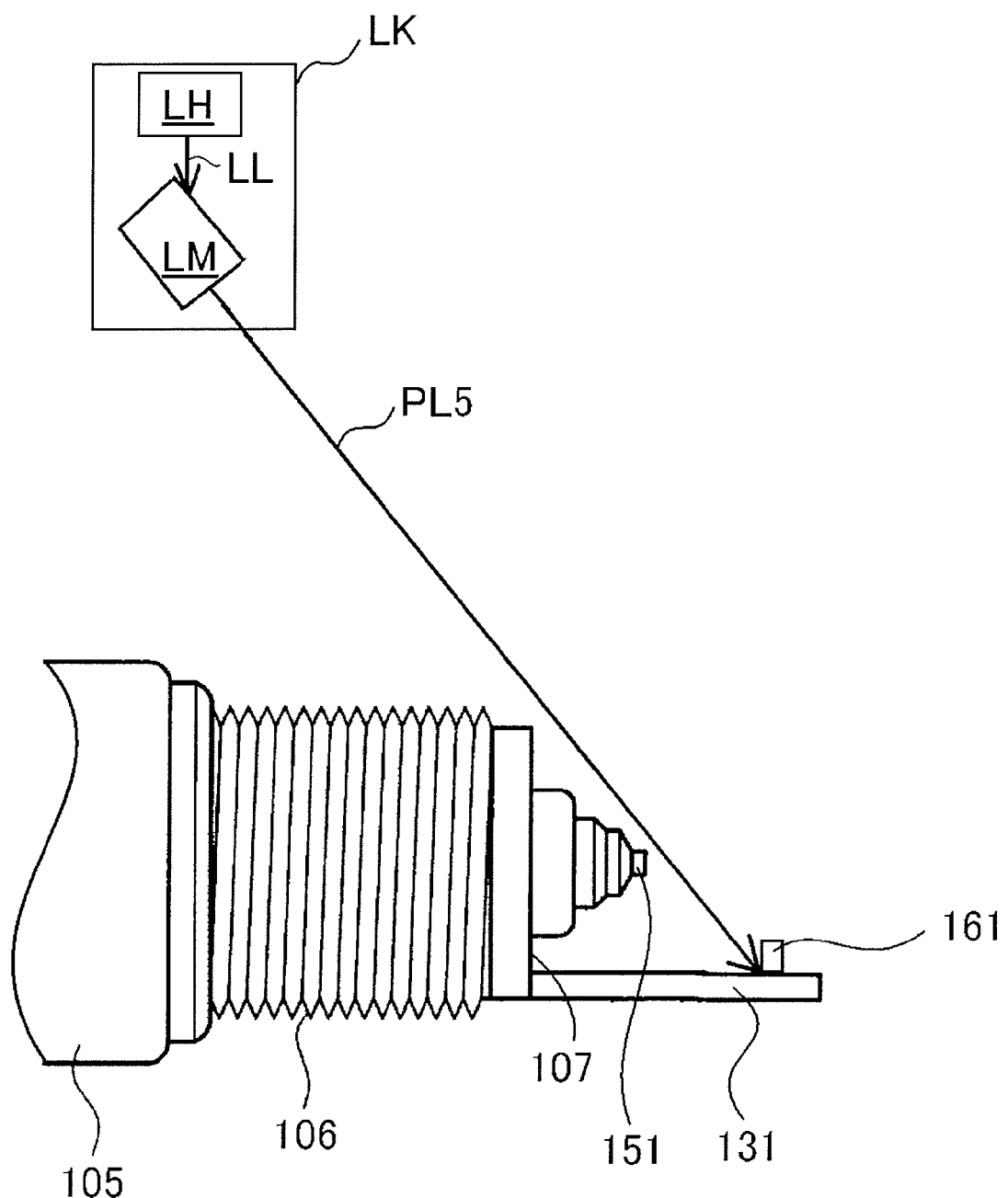
FIG. 14 is a diagram showing a laser welding process for welding an outer electrode tip to an outer electrode in connection with a method for manufacturing a spark plug of another modification.

In order to prevent adhesion of sputtered substances, which would be generated by laser irradiation when the outer electrode tip 161 is welded to the outer electrode 131 by means of a laser, to the laser beam emission unit, it is preferable to place a laser beam emission unit at a position opposite to the outer electrode tip 161 with reference to the leading end face 107 of the metal shell 105 and where exposure of an area to be welded to a laser beam PL5 is not hindered by the metal shell 105 and the outer electrode 131; and then to perform laser welding, as shown in FIG. 14.

Although the present invention has been described in detail by reference to the specific embodiment, it is apparent to those skilled in the art that various changes and modifications of the present invention may be made without departing the spirit and scope of the invention.

The present patent application is based on Japanese Patent Application (Patent Application No. 2007-097526) filed on Apr. 3, 2007, contents of which are incorporated herein by reference.

The invention claimed is:

1. A method for manufacturing a spark plug, the spark plug comprising:
    a center electrode comprising a center electrode base member and a center electrode noble metal tip welded thereto by means of a laser; and
    an outer electrode having an outer electrode base member and an outer electrode noble metal tip welded thereto by means of a laser, or an outer electrode base member, a tip base member joined thereto, and an outer electrode noble metal tip welded to the tip base member by means of a laser,
    said method comprising:
    a laser welding process for subjecting to laser welding by use of a laser beam:
        the center electrode base member and the center electrode noble metal tip, and
        the outer electrode base member and the outer electrode noble metal tip,
        or the tip base member and the outer electrode noble metal tip;
    wherein the laser beam has a BPP value of 25 mm·mrad (a radius·a half angle) or less at a time point when the laser beam enters a transfer optical system for guiding laser beam to an area to be welded, and
    wherein a BPP value achieved at a time point when the laser beam used for laser-welding the outer electrode base member and the outer electrode noble metal tip or the tip base member and the outer electrode noble metal tip enters the transfer optical system is smaller than a BPP value achieved at a time point when the laser beam used for laser-welding the center electrode base member and the center electrode noble metal tip enters the transfer optical system.

2. The method for manufacturing a spark plug according to claim 1, wherein the laser welding process is an entire circumference laser welding process for welding an entire circumference of the outer electrode noble metal tip by means of a laser while the outer electrode noble metal tip and the outer electrode base member or the outer electrode noble metal tip and the tip base member rotate relatively to the laser beam around an axial line of the outer electrode noble metal tip.

3. The method for manufacturing a spark plug according to claim 1, wherein the laser welding is performed in the laser welding process such that a fused portion where the outer electrode base member and the outer electrode noble metal tip are fused together or a fused portion where the tip base member and the outer electrode noble metal tip are fused together is connected at a center of the outer electrode noble metal tip in a radial direction thereof.

4. The method for manufacturing a spark plug according to claim 1, wherein a plurality of areas to be welded are simultaneously exposed to a plurality of laser beams in the laser welding process.

5. The method for manufacturing a spark plug according to claim 1,
wherein in the laser welding process, the outer electrode base member is fixed to an end face of a metal shell of the spark plug, thereafter the laser welding is performed in a state in which the outer electrode noble metal tip is placed at a predetermined position of the outer electrode base member that is yet to be bent and in which a laser beam emission unit of the transfer optical system which emits the laser beam toward the area to be welded is placed at a location opposite to the outer electrode noble metal tip with reference to the end face of the metal shell and where an emission of the laser beam to the area to be welded is not hindered by the metal shell and the outer electrode base member.

6. A method for manufacturing a spark plug, the spark plug Comprising:
a metal shell;
an outer electrode that is made of noble metal and that is welded to the metal shell by means of a laser, the outer electrode having an outer electrode base member and an outer electrode noble metal tip, or an outer electrode base member, a tip base member joined thereto, and an outer electrode noble metal tip; and
a center electrode comprising a center electrode base member and a center electrode noble metal tip,
said method comprising:
a laser welding process using a laser beam that has a BPP value of 25 mm·mrad (a radius·a half angle) or less at a time point when the laser beam enters a transfer optical system for guiding the laser beam to an area to be welded, the laser welding processing being for welding:
the metal shell to the outer electrode,
the center electrode base member to the center electrode noble metal tip, and
the outer electrode base member to the outer electrode noble metal tip, or the tip base member to the outer electrode noble metal tip;
wherein a BPP value achieved at a time point when the laser beam used for laser-welding the outer electrode base member and the outer electrode noble metal tip or the tip base member and the outer electrode noble metal tip enters the transfer optical system is smaller than a BPP value achieved at a time point when the laser beam used for laser-welding the center electrode base member and the center electrode noble metal tip enters the transfer optical system.

7. The method for manufacturing a spark plug according to claim 6, wherein a step index optical fiber is used as an optical fiber used in the transfer optical system.

8. The method for manufacturing a spark plug according to claim 1, wherein a step index optical fiber is used as an optical fiber used in the transfer optical system.

* * * * *